US008862858B1

(12) United States Patent
Ozdemir

(10) Patent No.: US 8,862,858 B1
(45) Date of Patent: Oct. 14, 2014

(54) METHOD AND SYSTEM FOR FAST BLOCK STORAGE RECOVERY

(71) Applicant: Kadir Ozdemir, San Jose, CA (US)

(72) Inventor: Kadir Ozdemir, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 264 days.

(21) Appl. No.: 13/630,274

(22) Filed: Sep. 28, 2012

(51) Int. Cl.
*G06F 12/10* (2006.01)
*G06F 11/14* (2006.01)

(52) U.S. Cl.
CPC ............ *G06F 12/10* (2013.01); *G06F 11/1412* (2013.01)
USPC .. 711/206; 711/E12.016; 714/2; 714/E11.084

(58) Field of Classification Search
None
See application file for complete search history.

(56) References Cited

U.S. PATENT DOCUMENTS

| 8,306,950 | B2 * | 11/2012 | Adkins et al. | 707/639 |
|---|---|---|---|---|
| 8,494,769 | B2 * | 7/2013 | Yamada | 701/533 |
| 8,677,055 | B2 * | 3/2014 | Ouye et al. | 711/103 |
| 8,700,842 | B2 * | 4/2014 | Dinker | 711/103 |
| 8,725,951 | B2 * | 5/2014 | Busch et al. | 711/133 |
| 8,793,531 | B2 * | 7/2014 | George et al. | 714/6.3 |
| 2008/0051992 | A1 * | 2/2008 | Yamada | 701/209 |
| 2011/0252181 | A1 * | 10/2011 | Ouye et al. | 711/101 |
| 2011/0252186 | A1 * | 10/2011 | Dinker | 711/103 |
| 2011/0252192 | A1 * | 10/2011 | Busch et al. | 711/105 |
| 2011/0283045 | A1 * | 11/2011 | Krishnan et al. | 711/102 |
| 2011/0307654 | A1 * | 12/2011 | Ma et al. | 711/105 |
| 2011/0307736 | A1 * | 12/2011 | George et al. | 714/6.2 |
| 2012/0054152 | A1 * | 3/2012 | Adkins et al. | 707/623 |
| 2013/0031058 | A1 * | 1/2013 | Adkins et al. | 707/649 |

* cited by examiner

*Primary Examiner* — Kevin Verbrugge
(74) *Attorney, Agent, or Firm* — Blakely, Sokoloff, Taylor & Zafman, LLP

(57) ABSTRACT

A computer-implemented method and apparatus manages block mapping. The block mapping maps physical blocks in a block storage device to virtual blocks of a virtual address space. The method involves assigning a generation number from a net of generation numbers to each block mapping entry, where the block mapping entry correlates a physical block with a virtual block. A maximum generation number of the set of generation numbers is increased and a first block mapping entry is marked dirty in response to an update of a correlated first virtual block. A generation number of the first block mapping entry is set to the maximum generation number. Finally, a generation number of a second block mapping entry having a lowest generation number is set to a generation number of the first block mapping entry.

21 Claims, 7 Drawing Sheets

METHOD AND SYSTEM FOR FAST BLOCK STORAGE RECOVERY

FIELD OF THE INVENTION

The embodiments of the invention relate to a method and system for tracking the block storage mapping between virtual block and physical blocks. Specifically, the embodiments relate to a method and system for recovering the mapping between the virtual blocks and the physical blocks without having to access each physical block.

BACKGROUND

Block devices store data in discrete units referred to as 'blocks.' These blocks typically have a fixed size and are the smallest unit of data that can be accessed from the device. It is common for hard disk drives and similar storage devices to be accessible as block storage devices. An operating system abstracts the block storage to overlay a file system on the block storage system. Applications can be given access over discrete block storage ranges, however this can create some inefficiencies in allocation where files do not utilize entire blocks or entire block allocations are not utilized.

Applications typically work with virtual address spaces defined by an operating system. These virtual address spaces can be mapped onto a set of physical blocks to store the contents of the virtual address space. The virtual address space virtualizes the details of the physical storage such that the size of virtual address space can be much greater than the size of the physical space, the virtual address space can grow and shrink on demand, and the blocks of the virtual address space can be allocated and freed dynamically. However, this introduces increased overhead in maintaining the virtual blocks and presents an issue of having to recover the state of the virtual blocks in the event of a failure. Depending on the importance of the data and the conditions under which the system is utilized, recovery can be a priority and redundant tracking of the mapping of the virtual blocks in the virtual address space and the physical blocks can be maintained and periodically stored in a persistent storage device. The proper protection of the mapping data and related meta-data enable the reconstruction of the virtual address spaces. The mapping data is often verified using cyclic redundancy checks, checksums and similar mechanisms to ensure that the mapping data is not corrupted. Where redundant copies of the mapping data are maintained, version numbers or similar indicators of the most up to date copy of the mapping data can be utilized.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A 'set,' as used herein refers to any positive whole number of items including one item.

Figure 1:
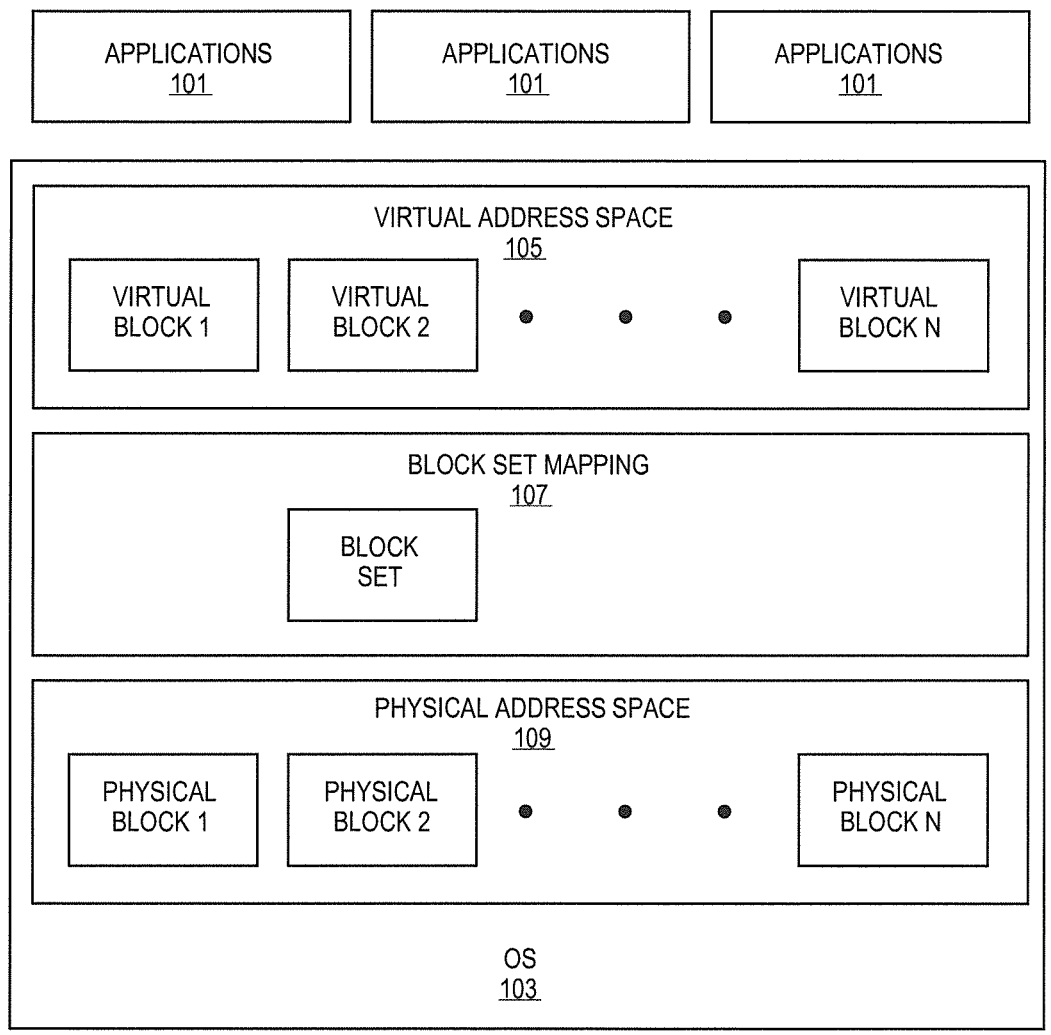
FIG. 1 is a diagram of one embodiment of an abstract representation of a computer storage system.

FIG. 1 is a diagram of one embodiment of an abstract representation of a computer storage system. The embodiments include a method and system for managing mapping data between virtual blocks representing a virtual address space 105 and physical blocks representing a physical address space 109. The embodiments utilize a block mapping structure, such as, for example a block set mapping as described herein below, or similar block mapping structure. The virtual address space 105 can be defined and created by an operating system 103 and made available or presented to applications 101. The OS 103 implements and/or controls the stack of software, firmware and hardware layers in a computer system. The OS 103 presents the virtual address space 105 to the application 101 and implements the mapping of this virtual address space 105 to the physical address space 109 via block set mapping 107 or similar implementation mechanisms. In some embodiments, the operating system can define multiple virtual address spaces or multiple layers of virtualization. For sake of clarity, examples are presented using a single virtual address space and single layer of virtualization.

In one example embodiment, block sets are used for the block mapping and to enable physical space management functions such as dynamically allocating and freeing blocks and growing and shrinking the virtual address space. The mapping from physical to virtual blocks can be persisted in a specific block mapping structure. In one example embodiment, the block mapping structure is a table called descriptor table. In addition, every physical block has a header section that holds the corresponding virtual block address used for reconstructing the block mapping structure (e.g., a descriptor table) when it is corrupted (or lost). One challenge in designing a block mapping system is that its block mapping structure corruptions require scanning the entire set of physical blocks (e.g., the block set) to reconstruct the block mapping structure which impacts the availability of the system. The embodiments described herein provide a system and method to eliminate the need for complete scans.

A block mapping structure (e.g., a block set) is an object that divides a contiguous virtual address space (e.g., file space) into fixed size blocks and provides means for space management functions such as dynamically allocating and freeing blocks and supporting the space growth and shrink operations. As discussed above, blocks in this virtual address space are referred to herein as virtual blocks. The block mapping structure maps these virtual blocks to the underlying storage device blocks (e.g., on a set of block storage devices) where the virtual blocks are actually stored. The storage device blocks are referred to herein as physical blocks. The term block storage device will be used to refer the underlying persistent storage device such as a hard disk, optical storage system, non-volatile memory device or similar system.

Figure 2A:
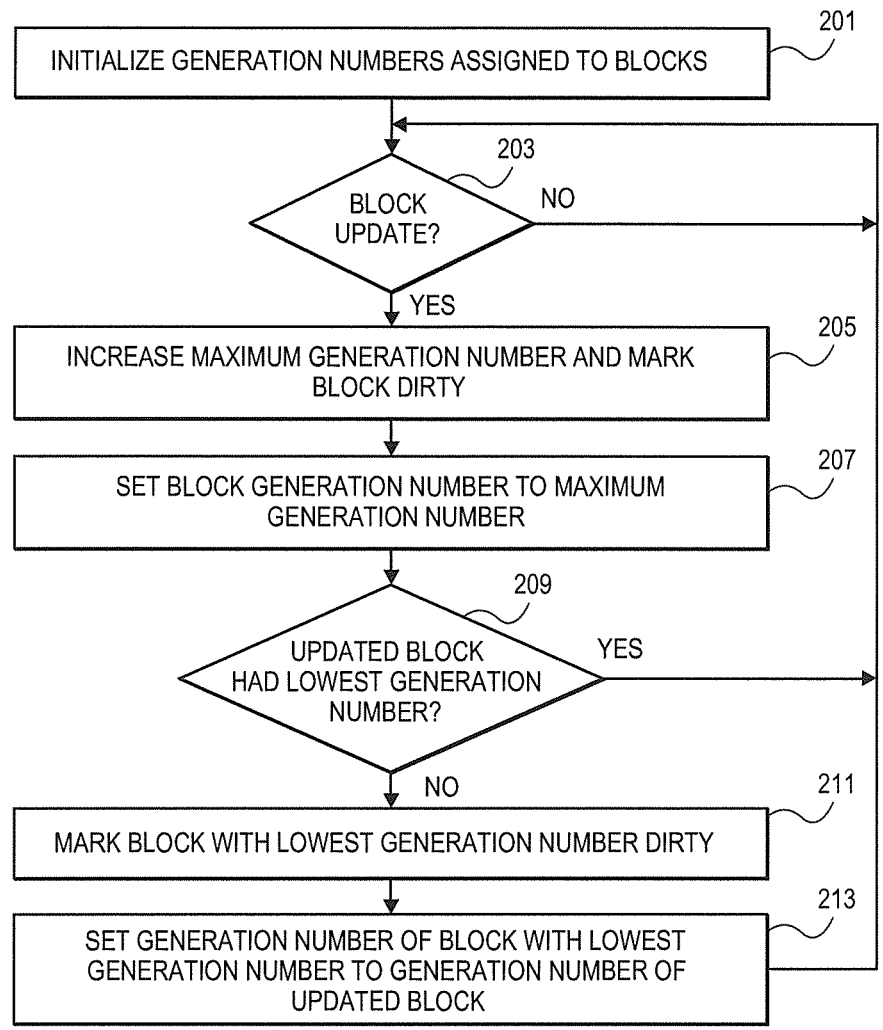
FIG. 2A is a flowchart of one embodiment of a process for managing mapping data for fast recovery.
Figure 2B:
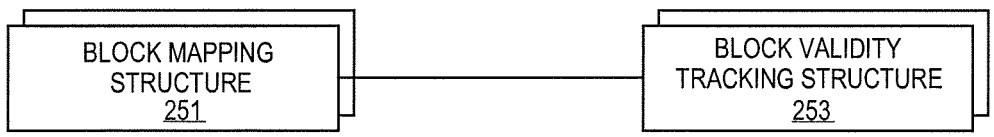
FIG. 2B is a diagram of one embodiment of data structures for supporting fast recovery.
Figure 2B:
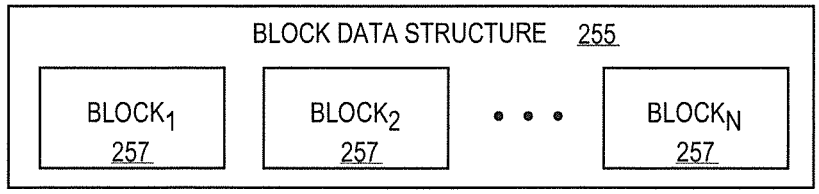

FIGS. 2A and 2B are diagrams of one embodiment of the mapping process and data structures. The data structures in FIG. 2B show a block mapping structure 251 that includes a tuple of physical block address and virtual block address, a block validity tracking structure 253 to maintain a sequence number (e.g., a generation number or 'gennum') and a validity indicator (e.g., a marker to indicate whether changed ('dirty') or unchanged from a copy in persistent storage) and a block data structure 257 containing the block meta data. Copies of these data structures are maintained in working memory for the computing device implementing the fast recovery process and system and are persisted to the block storage device as they are incrementally updated. These data structures maintained in memory are metadata for the actual data of the blocks. Maintaining these data structures in memory allows efficient searching and manipulation of the metadata. The actual data of the blocks is not a part of these data structures and is handled in separate, but correlated processes. Further, the block mapping structure 251 and the block validity tracking structure 253 have two copies (on the block storage device) that are alternately updated such that each block mapping structure and its corresponding block validity tracking structure are not updated at the same time as the other respective copy of each. Thus, if there is a failure during such an update, the other copy has a preceding valid state. The block validity tracking structure tracks a generation number for each block mapping structure entries or alternately a group of such entries, such that if there is a failure, each copy can be loaded and the most recent entries from each entry can be identified quickly solely using the information from block mapping structure 251 and the block validity tracking structure 253 without requiring the block data structure 257 to be traversed.

FIG. 2A is a flowchart of one embodiment for the process of maintaining the block mapping data that enables the fast recovery process. The fast recovery process is discussed further below. The block mapping maintenance process is ongoing through the use of the virtual address space that is being mapped. The process can be initiated at the time an operating system creates a virtual address space or at a similar time. The creation, expansion and contraction of the virtual blocks representing the virtual address space is outside the focus of this process and is understood by those skilled in the art. This maintenance process is directed to the determination of valid and most recent block mapping structure entries (i.e., the mapping tuples) or groups thereof such that upon recovery this block mapping structure can be quickly reconstituted without having the scan the block data structure.

Upon initialing these data structures, an initial sequence number or generation number is assigned to each block (i.e., each block mapping structure entry and corresponding block validity tracking structure entry) (Block 201). This generation number can be maintained in the block validity tracking structure in a tuple with the validity indicator. Changes to the blocks are continually checked for and the process waits until such change occurs (Block 203). These changes are likely to be changes to the mapping of the virtual blocks and corresponding physical blocks. These changes can be caused by elimination or expansion of the group of utilized virtual blocks or for similar causes.

In response to such an update, the maximum generation number for the virtual address space is increased (Block 205). A range of generation numbers are maintained as valid for the virtual address space at all times, where the range is sequential and full. The affected block or block mapping structure entry is marked as dirty in the corresponding entry of the block validity tracking structure. The block that has been changed has its generation number set to the new maximum generation value (Block 207). However, this can leave a temporary gap in the range, which is not permitted. A check is made whether the updated block had the lowest or minimum generation number (Block 209). If so, then no further updates are needed as no gap will result in the sequence in this instance. However, if the updated block was not the block with the minimum generation number, then the block with the lowest or minimum generation number is marked as dirty (Block 211) and its generation number is changed to that of the block that was updated to have the maximum generation number, thereby filling the gap in the sequence, but leaving the minimum generation number unassigned (Block 213). The minimum generation number can then be increased by one in this instance. In other embodiments, while it is required that the generation numbers be contiguous, there can be unassigned generation numbers to the high or low of the contiguous assigned range.

Figure 3:
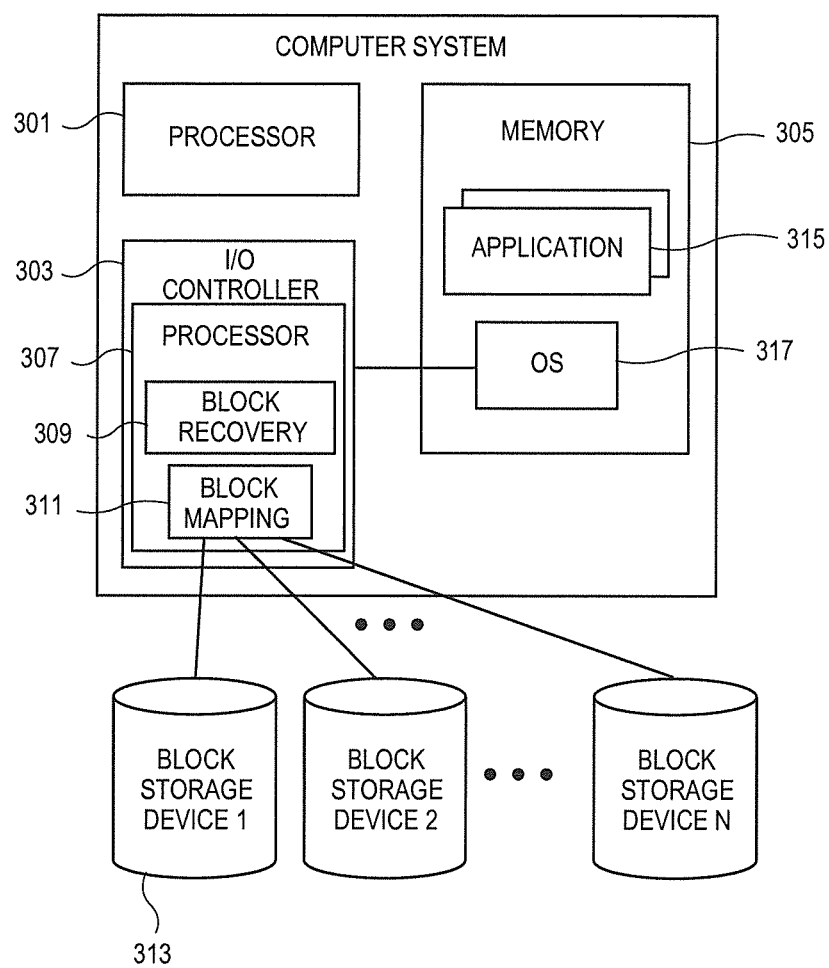
FIG. 3 is a diagram of one embodiment of a computer system for implementing the fast recovery process.

FIG. 3 is a diagram of one embodiment of the computer system for implementing the fast recovery method. In one embodiment, the fast recovery method can be implemented in a server (e.g., a back-up server), a desktop computer, a workstation, a network appliance, a console device or similar computing device. The computing device can include a processor 301, memory 305, input/output (I/O) controller 303, persistent storage devices 313 and similar components. These components can communicate over a set of busses over a backplane or through similar communication mechanisms.

The processor 301 can execute an operating system 317 and set of applications 315 or similar programs. The operating system 317 can generate the virtual address space to be mapped to the physical blocks of the persistent storage devices 313. The operating system 317 can program or interact with the I/O controller to implement the mapping process. In other embodiments, the I/O controller 303 implements the mapping independent of the operating systems.

The I/O controller 303 can include a processor 307 or similar component capable of executing a block recovery module 309, block mapping module 311 or similar components. These 'module' can be instructions executed by the processor 307. In another embodiment, these modules are integrated circuits within the controller 303 and can be referred to as 'hardware block recovery module' and 'hardware block mapping module' respectively. The block recovery module 309 implements the recovery of the block mapping information after a failure in the computer system as described further herein below. The block mapping module 311 implements the maintenance of the block mappings and associated meta data as described herein above and in the further examples provided herein below.

The persistent storage device 313 can include any number of block storage devices including hard disk drives (e.g., a redundant array of independent disks (RAID)), optical disks, non-volatile memory devices and similar storage devices. These storage devices can be configured to perform read and write operations in discrete blocks or sets of blocks or in analogous configurations. In some embodiments, the block storage can be further organized into containers, volumes or similar structures.

Figure 4:
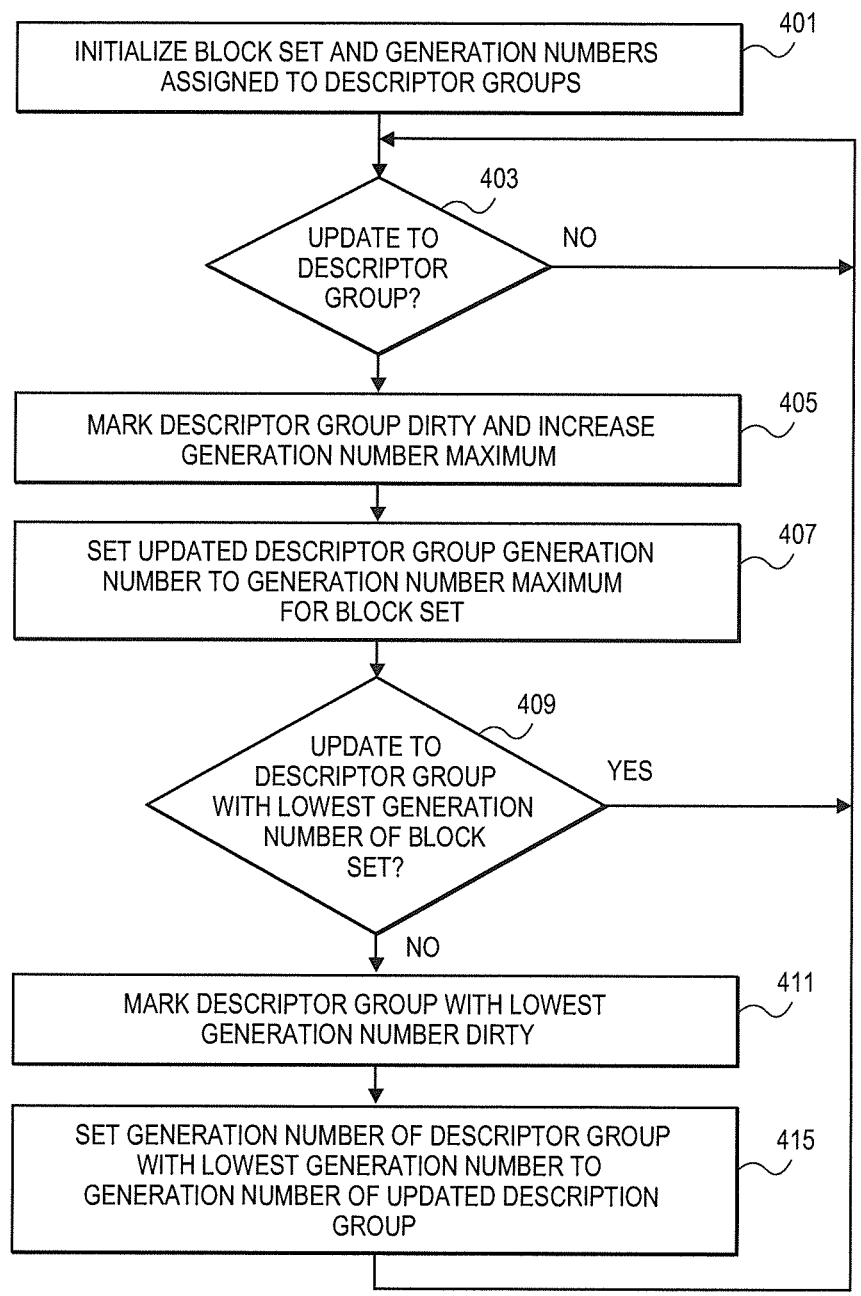
FIG. 4 is a flowchart of one example embodiment of a process for managing the mapping data for fast recovery.
Figure 5:
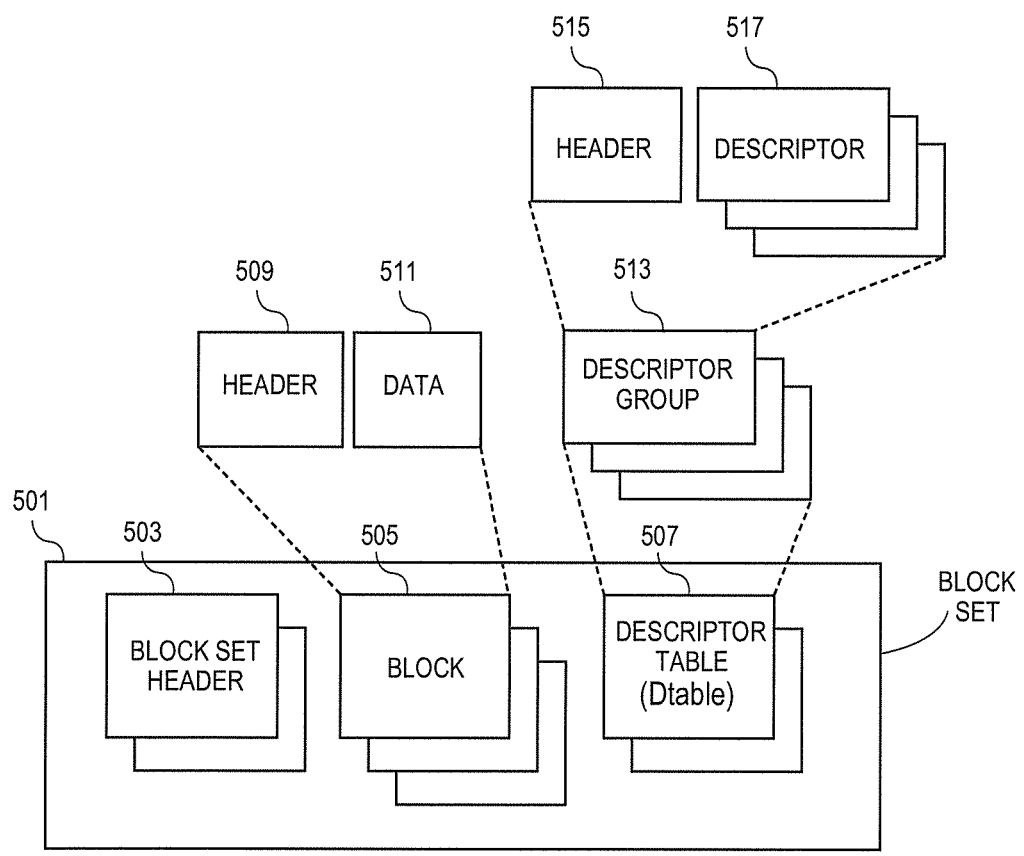
FIG. 5 is a diagram of one example embodiment of data structures for supporting the fast recovery

FIG. 4 is a flowchart of one example embodiment of the fast recovery process where the block mapping structure is implemented as a block set. The organization of the block set is described in relation to FIG. 5. The layout of the virtual address space managed by a block set 501 includes two copies of a header section 503 for the block set, an array of virtual blocks 505 and two copies of a table called descriptor table 507 (i.e., a block mapping structure). The metadata for the block set object is maintained in the header section 503 and descriptor table 507. The most notable fields of the block set header 503 track the total number of blocks and free blocks, block size, generation number (gennum), and a checksum for the descriptor table. In addition to these fields, a checksum field in the header is used to detect data corruptions of the block set header.

The descriptor table 507, abbreviated as dtable, is used to map the virtual blocks to the counterpart physical blocks and to maintain block states. The dtable 507 stores a set of entries referred to herein as 'descriptors' 517. A descriptor 517 includes the state for the corresponding block and a structure that describes what each block contains. Examples of block state values are free, allocated, and invalid. In addition, each virtual block 505 has its own header in addition to the data 511 of the block 505, the header of each block is referred to as block header 509. The dtable entry for a block 505 is stored in the header 509 of the block 505 for redundancy. This redundant information is used to recover the dtable 507 when it is corrupted.

The descriptor table 507 is an array of descriptor table entries or descriptors 517 that is divided into fixed size groups. These groups called descriptor groups 513. There are two descriptor tables 507 at the end of a block set. The nth descriptor group in one dtable is paired up with the nth descriptor group in the other table for n=0, 1, 2, . . . . The individual dtable entries are similarly paired. The paired-up descriptor groups 513 are updated in ping-pong (i.e., alternating) fashion to make sure that a new update does not overwrite a previous image. This alternating update process ensures that a previous state of the block set is not lost during an update to protect against failures during such updates. The descriptor group has a header structure 515 which protects the content of the descriptor group by maintaining a checksum computed over the content and other fields for checking the validity of the content. The generation number field of the descriptor group header is used to identify the most up-to-date and valid copy within a pair of descriptor groups 513. A descriptor group 513 is not valid if its generation number is greater than that of the block set header.

In one embodiment, a separate generation number is assigned for each descriptor group. Multiple descriptor groups can be updated in a transaction such that a set of descriptor groups are synched/flushed to persistent storage in a single transaction. However, each descriptor group in the transaction receives a separate unique generation number. When the transaction completes, the maximum generation number of the descriptor groups in the transaction is set as the maximum generation number of the block set. Thus, if a generation number of a descriptor group is greater than that of the block set header it would indicate that a transaction had failed to complete.

The block set header 503 copies are updated in alternating fashion as well. Thus, if the generation number of a descriptor 513 is greater than that of the most up-to-date copy of the block set header 503 then it means that the transaction has failed to complete. A logical descriptor table is an array of descriptor groups which are distributed over the two physical descriptor tables. A most up-to-date logical descriptor table is an array of descriptor groups such that only the most up-to-date copy within a pair of descriptor groups is included in the array.

The detailed example block set maintenance process is described further in reference to FIG. 4. The process starts by initializing the block set including the generation numbers assigned to the descriptor groups (Block 40)). A sequence of generation numbers are assigned in order to the descriptor groups with the constituent descriptors receiving the same generation number as the descriptor group. The block set then continues in use until a change in the mapping occurs such that a descriptor and its descriptor group are updated to indicate the change (Block 403).

The change to a descriptor and its descriptor group causes the descriptor group to be marked as 'dirty' (Block 405). The maximum generation number for the block set is also increased. The generation number for the updated or 'dirty' descriptor group is set to the new maximum generation number (Block 407). A check is then made whether the updated descriptor group was the descriptor group that had the lowest generation number in the block set (Block 409). This may be checked before it is changed, but the actions to be taken are made after it is changed.

If the updated descriptor group was the descriptor group with the lowest generation number, then no further adjustments are need. In one embodiment, a minimum generation number for the block set is maintained and can be increased to remove the unassigned generation number from the range of valid generation numbers.

If the updated descriptor group was not the descriptor group with the lowest generation number, then the descriptor group with the lowest generation number is marked as 'dirty' in preparation of its move (Block 411). The descriptor group with the lowest generation number is then assigned the generation number of the updated descriptor group that has been assigned the maximum generation number (Block 413). This reassignment of generation numbers keeps the sequence of generation numbers without any gaps that can lead to incoherency in interpretation during recovery. The process then continues until the next update of a descriptor group.

Figure 6:
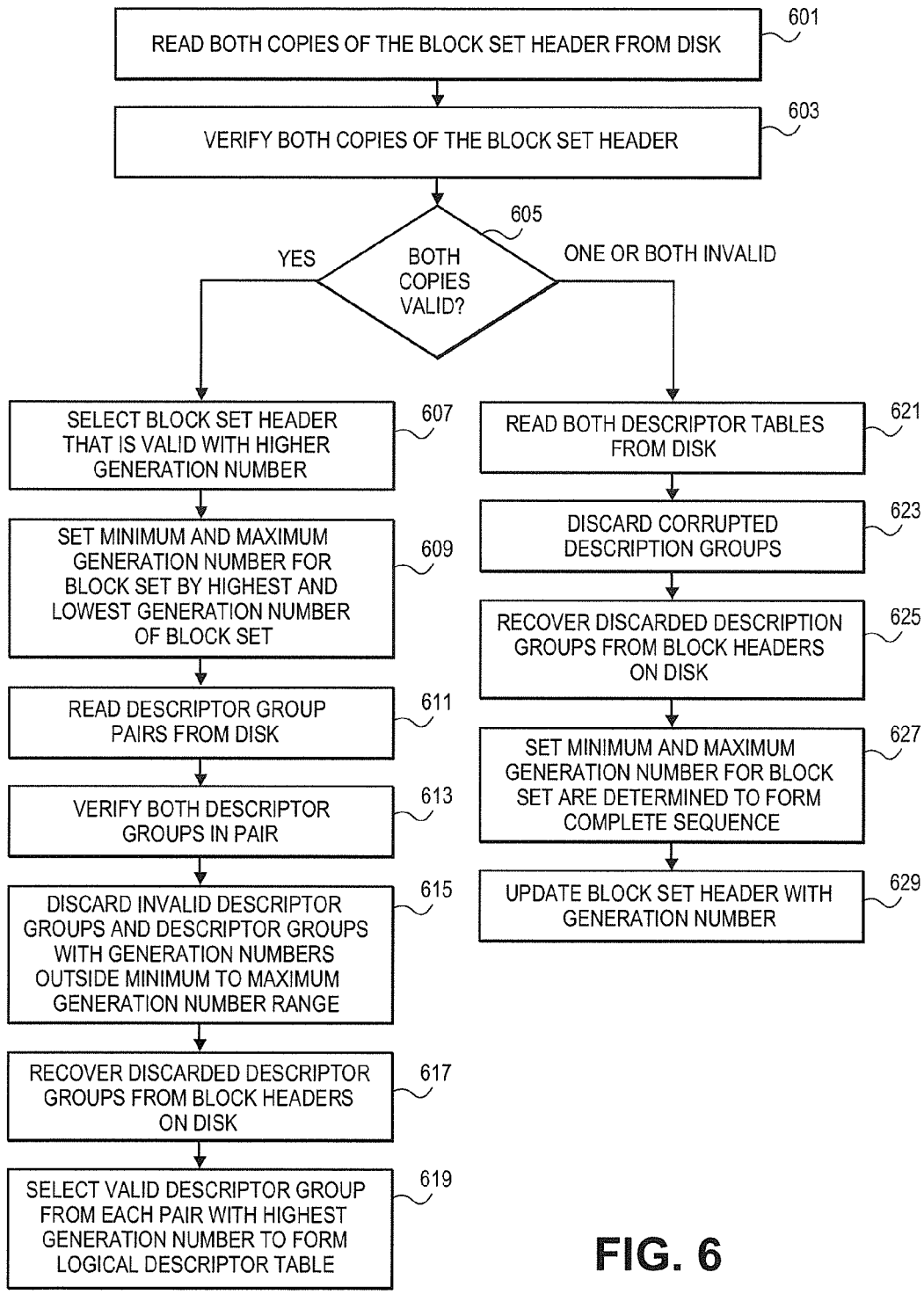
FIG. 6 is a diagram of one embodiment of the process for mapping data recovery.

FIG. 6 is a diagram of one embodiment of a process for fast recovery of the mapping data relying on the generation number sequence as generated by the above processes. This recovery process is described in relation to the block set example implementation. One skilled in the art would understand that it is applicable to other mapping data recovery scenarios.

The process starts during the restart or reboot of the system by reading both copies of the block set header from the persistent storage (Block 601). Both copies of the block set header are also verified (Block 603). A checksum in the block set header is used for verification. A check is made whether both copies are valid (Block 605).

If a header copy is corrupted, it is discarded. If both copies are corrupted then the dtable can be rebuilt by scanning block headers. If one or both copies of the block set header are corrupted then the logical dtable in memory is constructed by scanning both copies of the physical dtable on the persistent storage device (Block 621). Corrupted descriptor groups are discarded (Block 623) and they are recovered from the corresponding block headers on the persistent storage device (Block 625). Based on the generation number values on the descriptor groups, the low and high end of the generation numbers (i.e., a minimum generation number and a maximum generation number) are determined such that the generation numbers within this rage forms a complete sequence (Block 627). The block set header is updated accordingly (Block 629).

If both copies the block set header are valid then the one with the higher generation number is selected (Block 607). Based on the values on the block set header, the low and high end of the generation numbers (i.e., the minimum and maximum generation number) are set (Block 609). The logical descriptor table in memory is constructed by scanning both copies of physical descriptor table on the persistent storage device (Block 611). Each pair of descriptor groups are read from disk and verified using their header sections (Block 613). Corrupted descriptor groups and the descriptor groups with generation numbers outside the generation number range defined by the maximum and minimum generation numbers are discarded (Block 615) and they are recovered from the corresponding block headers on disk (Block 617). The valid descriptor group with the higher generation number is selected to form the logical descriptor table (Block 619).

It is clear that the above-described process will read only the block headers corresponding to the corrupted descriptors. By doing so, the process eliminates the need for scanning the entire block set to recover the descriptor table. It is noted that if the descriptor groups are not updated in sequence then the proposed process may double the number of descriptor updates for blocks allocations and deletions in the worst case. When the block set is used to implement log structured containers, the allocations are expected to happen in sequence. In addition, a small number of descriptor groups are updated in each block set synchronization operation because a single descriptor group covers multiple blocks.

The above-process describes a generation number update and descriptor table recovery method which does not require scanning the entire block set to recover descriptor table when descriptor groups are corrupted. The method has the following invariant:

Let n be the number of descriptor groups in a logical dtable. Let l and h define the low and high end of the generation numbers assigned to the descriptor groups in the logical dtable such that h=l+n−1. The generation numbers assigned to descriptor groups within a logical dtable form a complete sequence l, l+1, l+2, . . . , h.

This invariant is satisfied as follows:
1. When the block set is initialized, h=n−1 and l=0. The generation number (i.e., the gennum field) stored in block set header corresponds to h. l is implicit and n is equal to the num_blocks field of the header.
2. For each clean descriptor group dg to be updated, i.e., to become dirty in memory:
    a. The gennum value of the block set is increased by one. Let the new value be h.
    b. Let x be the gennum value of dg. The gennum value of the block set is copied to the gennum field of dg, that is, the gennum value for dg changes from x to h.
    c. If this update is not an in-order update, that is, x is not the minimum generation number in the block set (x!=h−n+2), then the descriptor group with the minimum generation number (=h−n+1) is marked dirty too and its gennum is set to x.

This process and system does not require maintaining a checksum for the logical descriptor table since its consistency is ensured by the complete sequence of generation numbers assigned to descriptor groups. The generation number of a descriptor group is copied to the block headers of the corresponding blocks when they are updated. This is utilized to recover the generation number for the descriptor group when it is corrupted. The maximum generation number within the block headers is the generation number for the descriptor group.

The process and system supports the transaction of updating multiple descriptor groups such that a set of descriptor groups are synched/flushed to disk in one transaction, however every descriptor group gets a unique generation number within the set. The transaction completes when the block set header is updated with the maximum generation number in the set. Thus, if the generation number of a descriptor is greater than that of the block set header, it means that the last transaction failed to complete.

Figure 7:
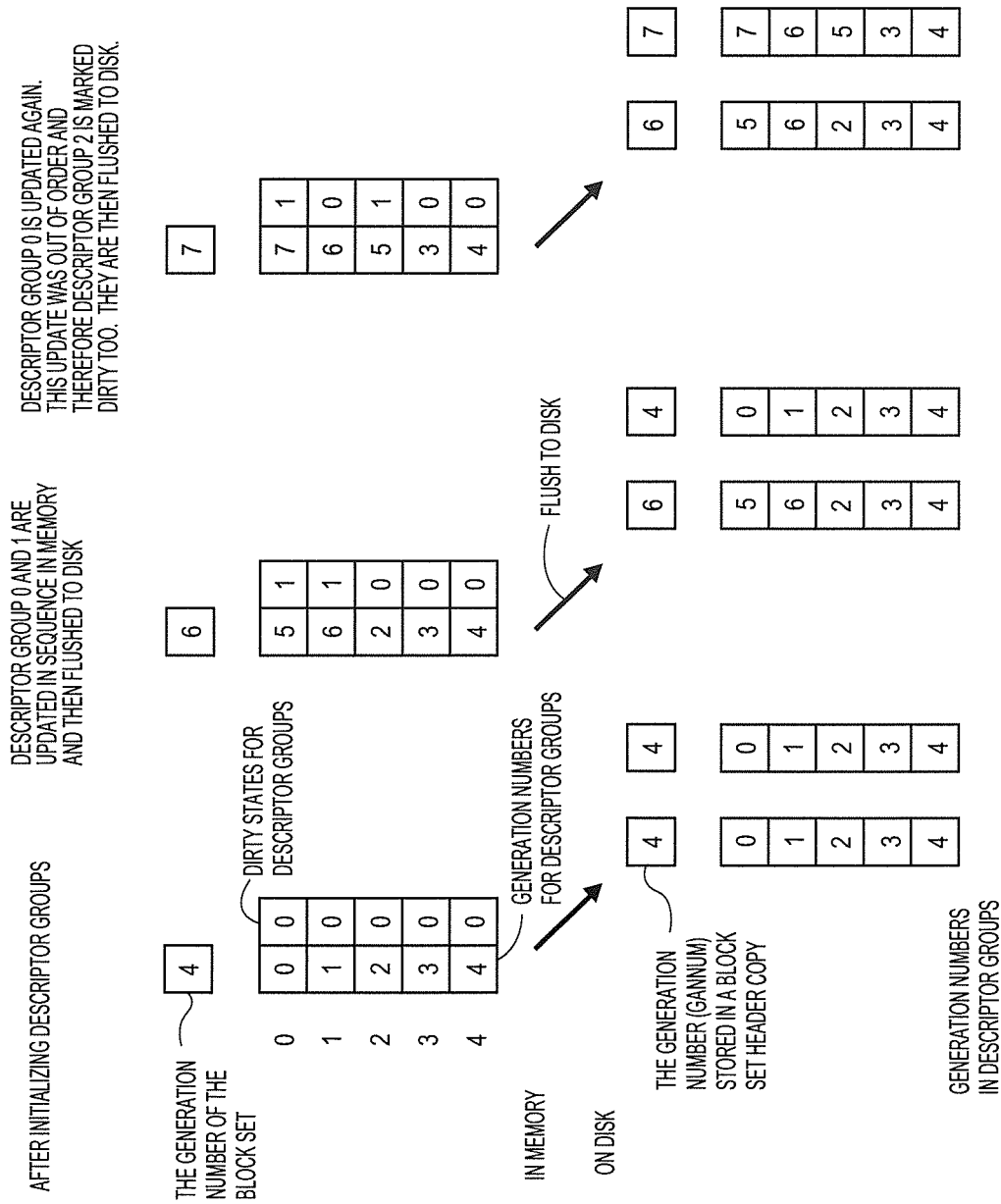
FIG. 7 is a diagram of one example of the mapping data coherency tracking process.

FIG. 7 is a diagram of an example to further illustrate the operation of the above-described process and system. The example illustrates a time line from left to right, with the left side of the showing an initial state of the system with the block validity tracking structure shown in both the memory along the top of the diagram and the persistent storage along the bottom of the diagram. The left column shows that the descriptors are assigned a sequence of generation numbers and none of the descriptors have yet been changed and are thus not 'dirty.'

In the second column, two of the descriptor groups (group 0 and group 1) have been modified. As a result, both are marked as dirty and the generation numbers have been updated. The maximum generation number was also increased for each change. Since the updated descriptor groups had the lowest generation numbers, no further changes to the generation numbers were need. These changes are also flushed to the persistent storage.

In the third column, one more descriptor groups is updated (group 0). The change to group 0 creates a gap in the generation number sequence. As a result, the descriptor group with the lowest generation number is marked as 'dirty' and assigned the generation number of the updated descriptor group. This change is then flushed to persistent storage. The result maintains the uninterrupted generation number range that can be relied upon in the fast recovery process.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing block mapping, the block mapping to map physical blocks in a block storage device to virtual blocks of a virtual address space, the method comprising:
    assigning a generation number from a set of generation numbers to each block mapping entry, where the block mapping entry correlates a physical block with a virtual block;
    increasing a maximum generation number of the set of generation numbers and marking a first block mapping entry dirty in response to an update of a correlated first virtual block;
    setting a generation number of the first block mapping entry to the maximum generation number; and
    setting a generation number of a second block mapping entry having a lowest generation number in the set of generation numbers to a generation number of the first block mapping entry that was replaced by the maximum generation number where the second block mapping entry is different from the first block mapping entry.

2. The computer-implemented method of claim 1, further comprising:
    marking the second block mapping entry as dirty in response to setting the generation number of the second block mapping entry.

3. The computer-implemented method of claim 1, wherein the block mapping entry is a descriptor group for a block set.

4. The computer-implemented method of claim 1, wherein the generation number of the block mapping entry is stored in a block validity tracking structure.

5. The computer-implemented method of claim 4, wherein the block validity tracking structure is a descriptor table.

6. The computer-implemented method of claim 3, further comprising:
    reading a first copy and a second copy of a block set header for the block set;
    verifying the first copy and the second copy of the block set header are valid; and
    selecting a first copy of the block set header, in response to the first copy of the block set header having a higher generation number than the second copy of the block set header.

7. The computer-implemented method of claim 6, further comprising:
    setting a minimum and maximum generation number for the block set by a highest and lowest generation number detected in the block set;
    reading corresponding descriptor groups from a first descriptor group and a second descriptor group;
    discarding invalid descriptor groups and discarding descriptor groups with generation numbers outside the minimum generation number to maximum generation number range; and
    recovering only discarded descriptor groups from block headers on the block storage device; and
    selecting a valid descriptor group from each pair of descriptor groups, where the selected descriptor group has a highest generation number in the pair of descriptor groups, to form a logical descriptor table.

8. A non-transitory computer-readable medium having stored therein a set of instructions for execution by a processing device, the instructions when executed cause the processing device to perform a set of operations for managing block mapping, the block mapping to map physical blocks in a block storage device to virtual blocks of a virtual address space, the method comprising:
    assigning a generation number from a set of generation numbers to each block mapping entry, where the block mapping entry correlates a physical block with a virtual block;
    increasing a maximum generation number of the set of generation numbers and marking a first block mapping entry dirty in response to an update of a correlated first virtual block;
    setting a generation number of the first block mapping entry to the maximum generation number; and
    setting a generation number of a second block mapping entry having a lowest generation number in the set of generation numbers to a generation number of the first block mapping entry that was replaced by the maximum generation number where the second block mapping entry is different from the first block mapping entry.

9. The non-transitory computer-readable medium of claim 8, having further instructions stored therein to perform additional operations further comprising:
    marking the second block mapping entry as dirty in response to setting the generation number of the second block mapping entry.

10. The non-transitory computer-readable medium of claim 8, wherein the block mapping entry is a descriptor group for a block set.

11. The non-transitory computer-readable medium of claim 8, wherein the generation number of the block mapping entry is stored in a block validity tracking structure.

12. The non-transitory computer-readable medium of claim 11, wherein the block validity tracking structure is a descriptor table.

13. The non-transitory computer-readable medium of claim 10, having further instructions stored therein to perform additional operations further comprising:
    reading a first copy and a second copy of a block set header for the block set;
    verifying the first copy and the second copy of the block set header are valid; and selecting a first copy of the block set header, in response to the first copy of the block set header having a higher generation number than the second copy of the block set header.

14. The non-transitory computer-readable medium of claim 13, having further instructions stored therein to perform additional operations further comprising:
   setting a minimum and maximum generation number for the block set by a highest and lowest generation number detected in the block set;
   reading corresponding descriptor groups from a first descriptor group and a second descriptor group;
   discarding invalid descriptor groups and discarding descriptor groups with generation numbers outside the minimum generation number to maximum generation number range; and
recovering only discarded descriptor groups from block headers on the block storage device; and
   selecting a valid descriptor group from each pair of descriptor groups, where the selected descriptor group has a highest generation number in the pair of descriptor groups, to form a logical descriptor table.

15. A controller for managing block mapping, the block mapping to map physical blocks in a block storage device to virtual blocks of a virtual address space, the controller comprising:
   a memory to store a block mapping structure; and
   a processor coupled to the memory, the processor configured to execute a block mapping module, the block mapping module to assign a generation number from a set of generation numbers to each block mapping entry in the block mapping structure, where the block mapping entry correlates a physical block with a virtual block, to increase a maximum generation number of the set of generation numbers and marking a first block mapping entry dirty in response to an update of a correlated first virtual block, to set a generation number of the first block mapping entry to the maximum generation number, and to set a generation number of a second block mapping entry having a lowest generation number in the set of generation numbers to a generation number of the first block mapping entry that was replaced by the maximum generation number where the second block mapping entry is different from the first block mapping entry.

16. The controller of claim 15, wherein the processor is further configured to mark the second block mapping entry as dirty in response to setting the generation number of the second block mapping entry.

17. The controller of claim 15, wherein the block mapping entry is a descriptor group for a block set.

18. The controller of claim 15, wherein the generation number of the block mapping entry is stored in a block validity tracking structure in the memory.

19. The controller of claim 18, wherein the block validity tracking structure is a descriptor table.

20. The controller of claim 17, wherein the processor is further configured to execute a block set recovery module to read a first copy and a second copy of a block set header for the block set, to verify the first copy and the second copy of the block set header are valid, and to select a first copy of the block set header, in response to the first copy of the block set header having a higher generation number than the second copy of the block set header.

21. The controller of claim 20, wherein the processor is further configured to execute the block set recover module to set a minimum and maximum generation number for the block set by a highest and lowest generation number detected in the block set, read corresponding descriptor groups from a first descriptor group and a second descriptor group, to discard invalid descriptor groups and discarding descriptor groups with generation numbers outside the minimum generation number to maximum generation number range, to recover only discarded descriptor groups from block headers on the block storage device, and to select a valid descriptor group from each pair of descriptor groups, where the selected descriptor group has a highest generation number in the pair of descriptor groups, to form a logical descriptor table.

\* \* \* \* \*